United States Patent [19]
Chvatal et al.

[11] Patent Number: 5,694,899
[45] Date of Patent: Dec. 9, 1997

[54] APPARATUS FOR REGULATING AN ENGINE PARAMETER

[75] Inventors: Dieter Chvatal, Jenbach; Albert Fahringer, Kössen; Friedrich Gruber, Hippach; Bernd Lutz, Schwaz; Diethard Plohberger, Jenbach, all of Austria

[73] Assignee: Jenbacher Energiesysteme Aktiengesellschaft, Jenbach, Austria

[21] Appl. No.: 691,570

[22] Filed: Aug. 2, 1996

[30] Foreign Application Priority Data

Aug. 4, 1995 [AT] Austria ............ 1328/95

[51] Int. Cl.⁶ ............ F02D 41/14; F02D 43/00
[52] U.S. Cl. ............ 123/350; 123/352; 60/611
[58] Field of Search ............ 123/336, 350, 123/352, 360, 361, 339.21, 339.23, 339.11; 60/611

[56] References Cited

U.S. PATENT DOCUMENTS

| | | | |
|---|---|---|---|
| 4,512,153 | 4/1985 | Kawabata et al. | 60/611 |
| 4,616,614 | 10/1986 | Abe | 123/339.21 |
| 4,619,230 | 10/1986 | Collonia | 123/339.21 |
| 4,619,232 | 10/1986 | Morris | 123/339.23 |
| 4,870,822 | 10/1989 | Kamimaru | 60/611 |

FOREIGN PATENT DOCUMENTS

| | | | |
|---|---|---|---|
| 3939754 | 6/1991 | Germany . | |
| 4030872 | 4/1992 | Germany . | |
| 58-18532 | 2/1983 | Japan | 60/611 |

*Primary Examiner*—Andrew M. Dolinar
*Attorney, Agent, or Firm*—Lorusso & Loud

[57] ABSTRACT

Apparatus for regulating an engine parameter, in particular the output power or the speed of rotation of an internal combustion engine, wherein there are provided two or more adjustable devices by way of which the engine parameter to be regulated can be influenced. There are provided two or more separate regulators, each of which regulates a respective one of the adjustable devices in dependence on the detected actual value of the engine parameter and a predeterminable reference value. There is also provided a change-over switching device by way of which selectively one of the regulators can be activated for regulating the adjustable device associated therewith.

11 Claims, 3 Drawing Sheets

APPARATUS FOR REGULATING AN ENGINE PARAMETER

BACKGROUND OF THE INVENTION

1. Field of the Invention

The invention concerns an apparatus for regulating an engine parameter, in particular the output power or the speed of rotation of an internal combustion engine, wherein there are provided two or more adjustable devices by way of which the engine parameter to be regulated can be influenced. The invention also concerns a method of regulating an engine parameter, in particular the output power or the speed of rotation of an internal combustion engine, wherein the engine parameter to be regulated can be regulated by way of two or more adjustable devices.

2. Related Art

In order in an internal combustion engine, for example a stationary gas engine, to regulate an engine parameter such as for example the output power or the speed of rotation of the engine, in most cases a plurality of adjustable devices are available on the engine. The throttle flap valve in the induction tract presents itself primarily for that purpose. In the case of a boosted internal combustion engine however it is also possible to influence the output power or engine speed for example by way of a controllable valve which is arranged in parallel relationship with the compressor (exhaust gas turbocharger) in the induction tract of the internal combustion engine. In order to ensure optimum efficiency of the internal combustion engine, the attempt has already been made to use electronic regulating apparatuses for simultaneously regulating two or more adjustable devices on the engine which all influence the engine parameter which is actually to be regulated. Such regulating arrangements however are highly complex and expensive.

SUMMARY OF THE INVENTION

The object of the invention is to provide a simple apparatus for regulating an engine parameter of an internal combustion engine and a suitable method for that purpose, in order to provide a regulation system which is simple in structure and mode of operation.

The apparatus according to the invention is characterised in that there are provided two or more separate regulators, each of which regulates a respective one of the adjustable devices in dependence on the detected actual value of the engine parameter and a predeterminable reference value, and that there is further provided a change-over switching device by way of which one of the regulators is selectively activatable for regulating the adjustable device associated therewith.

In contrast to the known approach using a large complex regulator for simultaneously adjusting two or more devices on the internal combustion engine, the invention now provides that there is a respective separate simple regulator for each of those adjustable devices. Each of those regulators can be of a simple construction and preferably needs to regulate only one of the adjustable devices. In order to be able to regulate the engine parameter over a wide range, adjustment of a single adjustable device on the engine will generally not suffice. In accordance with the invention therefore there are provided two or more such adjustable devices which are respectively regulated by a separate regulator, wherein there is provided a change-over switching device which selectively activates one of the regulators for regulating the adjustable device associated therewith. It is therefore only ever necessary for one of the regulators together with the associated adjustable device to operate while the other adjustable devices are held in a fixed position. In that way, in accordance with the preferred method according to the invention the engine parameter to be regulated can be regulated in different operating conditions, in particular at different levels of output power or engine speeds, by way of adjustment of another respective adjustable device, which considerably simplifies regulation.

In relation to an internal combustion engine in which a controllable valve is arranged in a bypass blowing duct arranged parallel to the compressor, it is particularly desirable if the engine parameter to be regulated is regulated in different operating conditions, in particular at different levels of output power or engine speeds, by way of adjustment of a respective other adjustable device, wherein there is only ever one of the adjustable devices that is adjusted by an associated regulator while the other adjustable device or devices are held in a fixed position.

This mode of regulation not only has the advantage of a simple regulator structure, but on the contrary in any operating condition it is possible precisely to use that adjustable device for regulation purposes, which in that operating condition exerts the best possible influence on the engine parameter to be regulated. For example at low engine speeds and power values, it is desirable to use the throttle flap valve for regulation purposes because it has a high level of influence on engine power or speed with just a small amount of adjustment, in that range. In contrast, at higher levels of output power and engine speeds the position of the throttle flap valve has only little influence on those engine parameters and is therefore less suitable for providing for regulation in that range. In that higher engine power and speed range however it is possible to achieve more efficient influencing of the engine parameter to be regulated, by way of other adjustable devices on the internal combustion engine, for example by way of a controllable valve in the bypass blowing duct of a compressor. The change-over switching device establishes which regulator together with associated adjusting device is just actively regulating while the other adjustable devices are held in a fixed position.

BRIEF DESCRIPTION OF THE DRAWINGS

Further advantages and features of the invention are described in greater detail with reference to the following specific description. In the drawing.

DETAILED DESCRIPTION OF THE PREFERRED EMBODIMENT

Figure 1:
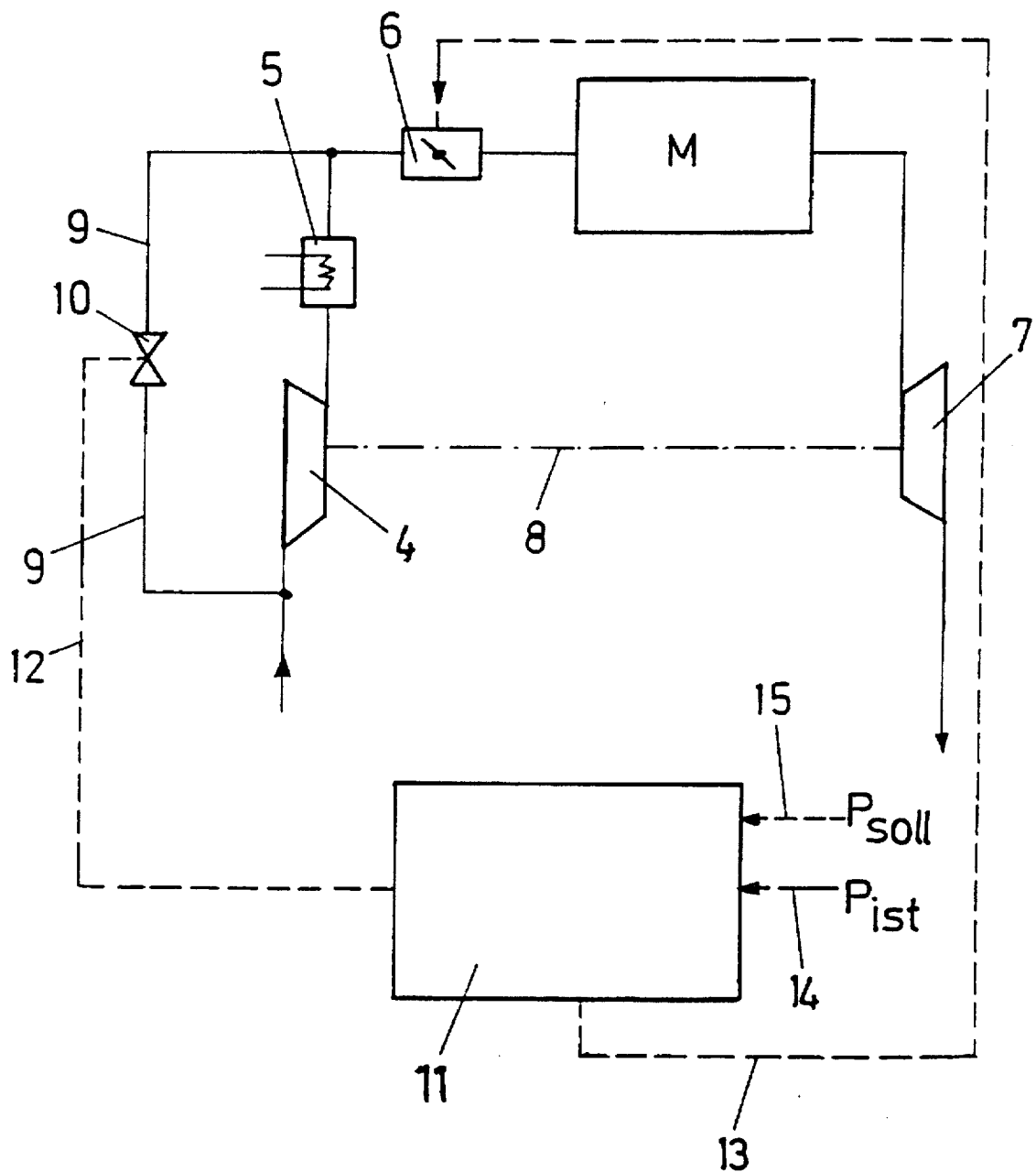
FIG. 1 is a diagrammatic view of an embodiment of an apparatus according to the invention.

In the embodiment illustrated in FIG. 1, an internal combustion engine is fed by way of a compressor 4, the compressed gas or gas mixture passing by way of a charge air cooler 5 and a throttle 6 into the internal combustion engine M. The exhaust gases drive the turbine 7 which by way of a shaft 8 drives the compressor blades (exhaust gas turbocharger). In order to prevent an undesired pumping effect or surge in the induction tract, a bypass blowing duct 9 (recycling duct) is provided in parallel with the compressor 4, a preferably electrically regulatable proportional valve 10 being disposed in the duct 9. By opening of the valve 10 the gas flow through the compressor can be increased and the pressure downstream of the compressor can be reduced and thus the surge effect avoided.

In order to regulate the output power of the internal combustion engine M, there is provided an apparatus 11 which by way of control lines 12 and 13 regulates two adjustable devices, by way of which the output power to be regulated can be influenced. In the illustrated embodiment those adjustable devices are on the one hand the throttle flap valve 6 in the induction tract of the internal combustion engine M and on the other hand the controllable valve 10 in the bypass blowing duct 9. The instantaneous actual value of the output power $P_{ist}$ is fed to the device 11 by way of the input 14. A reference value for the desired power $P_{soll}$ is provided by way of the reference value input 15.

Figure 2:
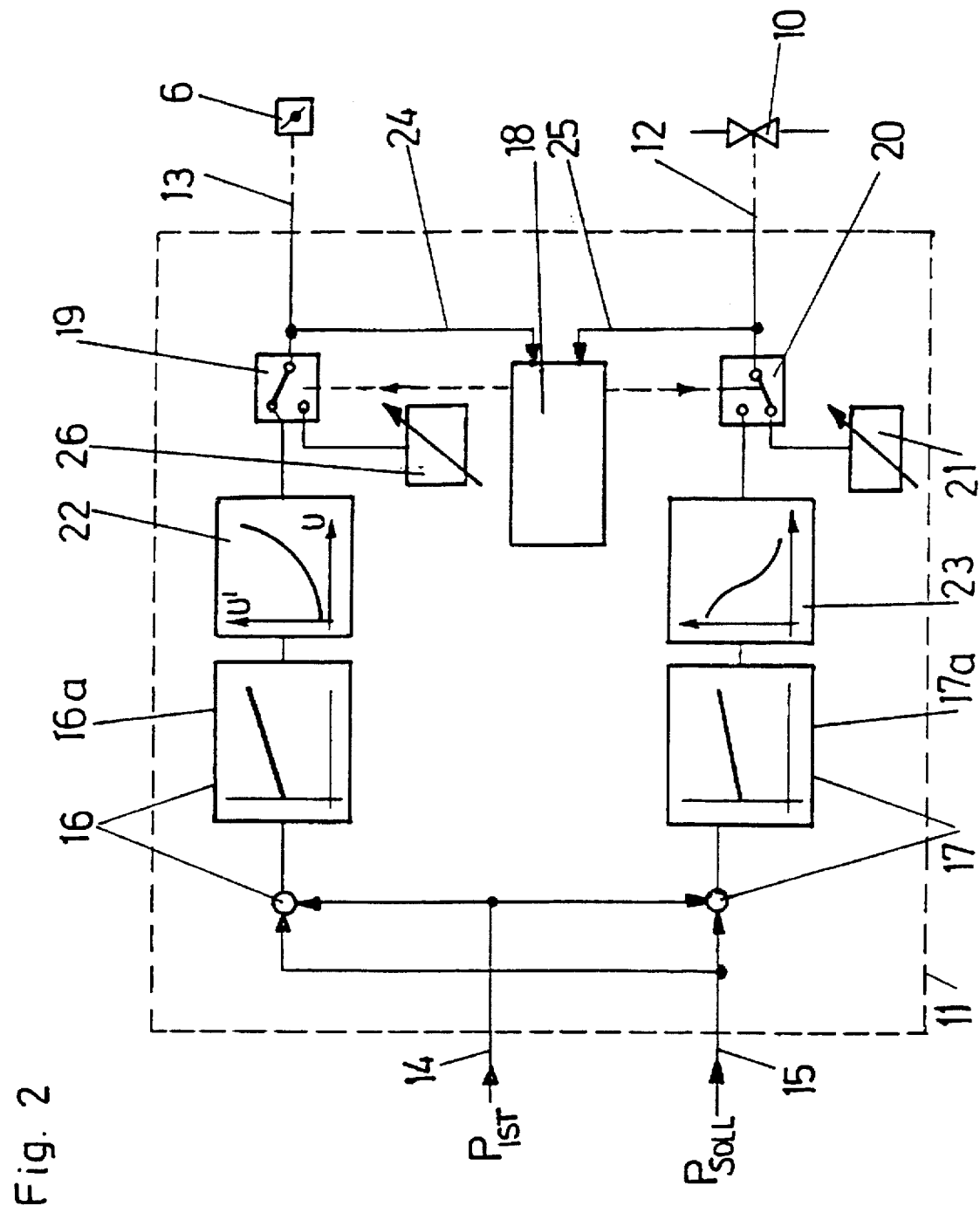
FIG. 2 is a detailed block circuit diagram of an embodiment of the apparatus according to the invention.

As FIG. 2 shows, there are provided two separate regulators 16 and 17, each of which regulates a respective adjustable device 6 and 10 respectively in dependence on the detected actual value $P_{ist}$ of the output power and a predeterminable reference value $P_{soll}$ of the power. There is also provided a change-over switching device 18 by way of which selectively one of the regulators 16 or 17 can be activated by way of the switching units 19 and 20 respectively for regulating the adjusting device 6 and 10 respectively associated therewith. In that respect the change-over switching device 18 is so designed that it only ever activates one of the two regulators 16 and 17, that is to say feeds the control parameter outputted by the respective regulator actually to the adjustable device 6 or 10 respectively by way of the switching unit 19 or 20 respectively.

In the position shown in FIG. 2 the internal combustion engine is in the low power range in which output power regulation is effected by way of the throttle flap valve 6, that is to say the regulator 16 is active while the regulator 17 is inactive in the sense that its output signal does not regulate the valve 10. On the contrary the valve 10 is connected by way of the switch unit 20 to a device 21 for outputting a preset table electrical control signal which for example outputs a signal which fully opens the valve 10 in the bypass, blowing duct 9 in the low output power range.

Each regulator 16 or 17 advantageously has a PID-regulating unit 16a, 17a. Desirably a non-linear transmission member 22 and 23 respectively is installed between the regular-or 16, 17 and the associated adjustable device 6 or 10 respectively in order to produce different amplification effects in different output power ranges. Thus for example the fact that the throttle flap valve has scarcely any more influence on the output power in the higher output power range can be at least partially compensated by increasing the degree of amplification in that output power range. For that purpose for example the transmission member 22 has a characteristic which is inverse in relation to the throttle flap valve characteristic and which converts the output signal U of the regulator 16 with non-linear amplification gain into an output signal U' which is finally fed to the throttle flap valve 6.

In the illustrated embodiment the change-over switching device 18 is controlled by way of the lines 24 and 25 respectively in dependence on the position of the adjustable device 6, 10 or the electrical control signals which are fed to those devices, more specifically in such a way that in a lower output power range, up to full opening of the throttle flap valve 6, regulation is effected by way of the throttle flap valve position while the valve 10 is fully opened and that from the attainment of the full throttle flap valve position the switch units 19 and 20 are switched over. Then, by virtue of the output of a corresponding preset table electrical control signal the device 26 holds the throttle flap valve in the fully opened position and the activated regulator 17 increasingly closes the valve 10, with increasing desired output power, until finally when full power is reached, with the throttle flap valve 6 fully opened, the valve 10 is fully closed.

The change-over switching device 18 can also be controlled in dependence on the detected actual value $P_{ist}$ or reference value $P_{soll}$ of the engine parameter to be regulated, namely in the present embodiment the output power, more specifically in such a way that the change-over switching device only ever activates one of the two regulators 16 or 17.

The method according to the invention which is carried into effect for example with the above-described devices is characterised in that the engine parameter to be regulated, in different operating conditions, in particular with different levels of output power or engine speeds, is regulated by way of adjustment of a respective other adjustable device, wherein there is only ever one of the adjustable devices that is adjusted by an associated regulator while the other adjustable device or devices are held in a fixed position.

A particularly preferred method, in an internal combustion engine in which a controllable valve is arranged in a bypass blowing duct arranged in parallel with a compressor, is one in which in the lower output power or speed range of the internal combustion engine, the controllable valve is completely opened and the output power or engine speed is regulated by way of the position of the throttle flap valve in the induction tract, and that in an upper output power or engine speed range the throttle flap valve is completely opened and the output power or engine speed is regulated by way of the degree of opening of the controllable valve.

Figure 3:
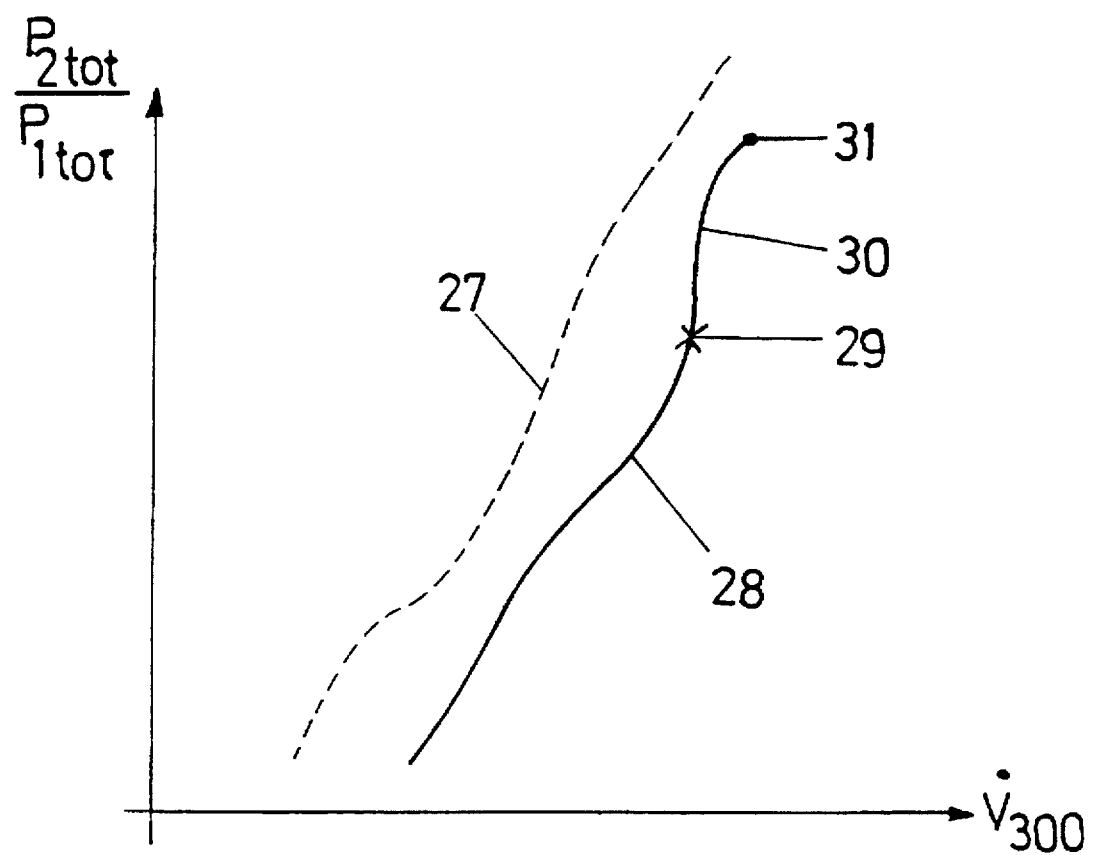
FIG. 3 shows a typical compressor characteristic.

With such a method a boosted internal combustion engine can be regulated in terms of power in a simple manner, in that respect operation always remaining below the so-called pump or surge limit 27 in the compressor characteristic graph shown in FIG. 3. In that graph the pressure ratio of the total pressures $P_{2tot}/P_{1tot}$ is plotted against a standardised gas throughput $\dot{V}_{300}$. Such compressor characteristics are supplied by the manufacturers of the compressors and include in particular the illustrated pump or surge limit 27, above which undesired pumping or surge occurs in the induction tract of the internal combustion engine. In accordance with the described preferred embodiment of the method according to the invention it is now possible to regulate the output power by way of the throttle flap valve in the low output power range as indicated by the line 28 while the valve 10 in the bypass blowing duct is fully opened. Then, at point 29, there is a change to regulation by way of the position of the valve 10 while the throttle flap valve 6 is fully opened. That is the range 30 in FIG. 3. Finally at point 31 the rated power is attained when the throttle flap valve 6 is (almost) fully open and the valve 10 is (almost) fully closed. Operation therefore is always certain to range below the pump or surge limit 27, in which respect measurements have shown that a closer approach to the pump or surge limit only immaterially increases the efficiency of the engine so that by virtue of a safety interval, with the simple regulation effect according to the invention, there are no relevant disadvantages in terms of the efficiency of the engine.

It will be appreciated that the invention is not limited to the illustrated embodiments, but for example other engine parameters, in particular the speed of rotation, can also be regulated in accordance with the ideas of the invention. It is certainly desirable if the change-over switching device 18 automatically selects the respective regulator to be activated. In principle however it would also be possible to effect here a manual change-over switching action. The regulator structure is particularly simple when each regulator only ever regulates a single adjustable device on the internal combustion engine. In principle however it would also be possible for a regulator to regulate a set of a few adjustable such devices while the other regulator regulates another adjustable device or also a set of adjustable devices.

We claim:

1. Apparatus for regulating an engine parameter, in particular the output power or the speed of rotation of an internal combustion engine, wherein there are provided two or more adjustable devices by way of which the engine parameter to be regulated can be influenced, the apparatus comprising at least two separate regulators, each of which regulates a respective one of the adjustable devices in dependence on the detected actual value of the engine parameter and a predeterminable reference value and a change-over switching device by way of which a selected one of the regulators can be activated for regulating the adjustable device associated therewith so that at all times at least one of the regulators is actually activated for regulating the associated adjustable device.

2. Apparatus as set forth in claim 1 characterised in that one of the adjustable devices is the throttle flap valve in the induction tract of the internal combustion engine.

3. Apparatus as set forth in claim 1 characterised in that each regulator has a PID-regulating unit.

4. Apparatus as set forth in claim 1 characterised in that a non-linear transmission member is installed between the regulator and the associated adjustable device.

5. Apparatus as set forth in claim 1 characterised in that the change-over switching device is controlled in dependence on the position of the adjustable devices or the electrical control signals fed to said devices.

6. Apparatus as set forth in claim 1 characterised in that for each adjustable device, apart from the associated regulator, there is provided a device for the output of a presettable electrical control signal, and the change-over switching device selectively switches the output of the regulator or the output of the control signal device to the adjustable device.

7. Apparatus for regulating an engine parameter, in particular the output power or the speed of rotation of an internal combustion engine, wherein there are provided two or more adjustable devices by way of which the engine parameter to be regulated can be influenced, the apparatus comprising at least two separate regulators, each of which regulates a respective one of the adjustable devices in dependence on the detected actual value of the engine parameter and a predeterminable reference value and a change-over switching device by way of which selectively one of the regulators can be activated for regulating the adjustable device associated therewith so that at all times at least one of the regulators is actually activated for regulating the associated adjustable device, wherein one of the adjustable devices is a controllable valve which is arranged in a bypass blowing duct disposed parallel to a compressor arranged in the induction tract.

8. Apparatus as set forth in claim 7 wherein the compressor is an exhaust gas turbocharger.

9. Apparatus for regulating an engine parameter, in particular the output power or the speed of rotation of an internal combustion engine, wherein there are provided two or more adjustable devices by way of which the engine parameter to be regulated can be influenced, the apparatus comprising at least two separate regulators, each of which regulates a respective one of the adjustable devices in dependence on the detected actual value of the engine parameter and a predeterminable reference value and a change-over switching device by way of which selectively one of the regulators can be activated for regulating the adjustable device associated therewith so that at all times at least one of the regulators is actually activated for regulating the associated adjustable device, wherein the change-over switching device is controlled in dependence on the actual value or the reference value of the engine parameter to be regulated.

10. Apparatus for regulating an engine parameter, in particular the output power or the speed of rotation of an internal combustion engine, wherein there are provided two or more adjustable devices by way of which the engine parameter to be regulated can be influenced, the apparatus comprising at least two separate regulators, each of which regulates a respective one of the adjustable devices in dependence on the detected actual value of the engine parameter and a predeterminable reference value and a change-over switching device by way of which selectively one of the regulators can be activated for regulating the adjustable device associated therewith so that at all times at least one of the regulators is actually activated for regulating the associated adjustable device, wherein the change-over switching device only ever activates one of the regulators with associated adjustable device for regulating the engine parameter.

11. A method of regulating an engine parameter of an internal combustion engine in which a controllable valve is arranged in a bypass blowing duct arranged parallel to a compressor, characterised in that in the lower power or speed range of the internal combustion engine the controllable valve is completely opened and the output power or engine speed is regulated by way of the position of the throttle flap valve in the induction tract, and that in an upper output power or engine speed range the throttle flap valve is constantly fully opened and the output power or engine speed is regulated by way of the degree of opening of the controllable valve.

* * * * *